United States Patent Office 2,982,777
Patented May 2, 1961

2,982,777

THIOCYANOHYDRINE DERIVATIVES OF THE STEROID SERIES AND PROCESS OF MAKING SAME

Wolfgang Loechel, Berlin-Spandau, Helmer Richter, Berlin-Grunewald, and Martin Schenck, Berlin-Frohnau, Germany, assignors to Schering A.G., Berlin, Germany, a corporation of Germany No Drawing. Filed Apr. 15, 1958, Ser. No. 728,523

2 Claims. (Cl. 260—397.45)

This invention relates to novel thiocyanohydrine derivatives of compounds of the steroid series. More particularly, the invention concerns a novel method for the preparation of thiocyano derivatives of the cholestane, androstane, and pregnene series.

Thiocyanohydrines of the steroid series have not heretofore been described in the literature. Some thiocyanosteroids have already been prepared, utilizing therefor as starting materials either halogenated steroids and exchanging the halogen for the thiocyano group by conversion with alkali thiocyanates, or else, by treating 3-ketosteroids with dithiocyano compounds under ultraviolet light. Both of these methods do not lead to thiocyanohydrines.

It has now been found, in accordance with this invention, that thiocyanohydrines of the steroid series may be obtained in a simple reaction starting with steroid epoxides and treating the epoxides with thiocyanic acid. Preferably, an excess of the thiocyanic acid is used; thereby the epoxide bonds are severed, with addition of the thiocyanic acid. Salts of thiocyanic acid with organic bases may also be employed, for example salts of tertiary bases, such as pyridine.

As starting materials for the novel process of this invention, there may be used epoxides of the steoroid series, in which the steroid molecule may be either saturated or unsaturated, and furthermore may contain other additional substituents such as oxygen and/or hydroxy groups, and may contain a side chain at the 17-carbon. Advantageously, there may be used $9\beta,11\beta$- and $5\alpha,6\alpha$-epoxides, which are split off with an excess of thiocyanic acid. Thereby there are formed predominantly $9\alpha$- and $6\beta$-thiocyanosteroids. The process can also be carried out so that the thiocyanic acid is allowed to act upon the epoxide in an inert organic solvent, in which the epoxide is likewise soluble, such as, for example, ether. This method is especially desirable for readily dissociable epoxides, such as, for example, the $5\alpha,6\alpha$-epoxides. It is more advantageous, however, to operate in a two phase system. In such a system, concentrated, aqueous thiocyanic acid (about 25%) acts upon the steroid epoxide, which is dissolved in an inert solvent which is immiscible with water, such as, advantageously, a halogenated hydrocarbon, for example, methylene chloride or chloroform. Upon shaking for several hours at room temperature, preferably with exclusion of light and in an atmosphere of nitrogen, the introduction of the thiocyano group takes place.

The foregoing method possesses the following advantages over the use of ethereal thiocyanic acid:

(a) Improved solubility of most steroid epoxides in halogenated hydrocarbons as compared with ether;

(b) Higher concentration of aqueous thiocyanic acid is possible than in ether;

(c) In contrast to the single phase method, the possibly sensitive steroid is always kept apart from the nonsteroids by means of the acid, since the reaction only takes place at the phase boundaries.

In accordance with this invention, a considerable excess of concentrated, aqueous thiocyanic acid is preferably used. Inasmuch as highly concentrated aqueous thiocyanic acid is very unstable (decomposing, inter alia, into hydrogen sulfide, hydrogen cyanide, and forming polythiocyano compounds), the epoxide splitting occurs only with comparatively strong concentrations of thiocyanic acid. The formation of polythiocyano compounds is prevented by working under nitrogen. Any polythiocyano compounds formed may be readily removed.

It was further found, in accordance with the invention, that the splitting of the epoxides of steroids takes place under particularly favorable conditions when the epoxides are heated with the thiocyanate salts of organic bases, especially tertiary bases such as pyridine, in a solvent under reflux. In such case, the pyridinium thiocyanate is preferably used in excess, for example, 5 mols. There may be used as solvents, for example, ethanol, or acetone, or similar solvents. There may also be used, as a solvent, however, a tertiary base such as the one used for salt formation.

The splitting of simple aliphatic or cyclic alkylene oxides with ethereal thiocyanic acid is known. In such case the alkylene oxides are used in excess and after completion of the reaction the excess oxide is distilled off. It could not be predicted from this circumstance, however, that a process of this general type would be adaptable to such complexly constituted and variably reactable compounds as the steroids. As a matter of fact, the process of the present invention differs from the previously known method in that an excess of thiocyanic acid is used. A removal of the epoxides by distillation, paralleling the known alkylene oxide method, would be out of the question in the case of steroid compounds.

These pseudohalogen compounds, particularly where the thiocyano group occupies the 6- or 9-position, can be used as such as therapeutic agents, or they can serve as intermediates for conversion into pharmaceutically valuably steroid compounds. Thus, for example, $9\alpha$-thiocyano-$11\beta$-hydroxy-$17\alpha$-methyl-testosterone is a valuable anabolic agent. $9\alpha$-thiocyano-hydrocortisone - 21 - acetate is an active cortical hormone having an anti-inflammatory action of the type characteristic of hydrocortisone as evidenced by the glycogen test and the thymus test. The new thiocyanohydrines of the steroid series are also valuable as intermediates since by known methods the thiocyano group may be transformed into —SH, —S—S—, —S-alkyl, —SO$_3$H, or —OH groups, and by splitting off water they can be transformed into unsaturated thiocyanohydrines. An example of a product resulting from splitting off water is 6-thiocyano-$17\alpha$-hydroxy-progesterone acetate, which exhibits an activity similar to that of $17\alpha$-hydroxyprogesterone acetate. It is noteworthy that the above-mentioned transformations of the thiocyano group take place even more readily in the case of the products of splitting off water than in the case of the thiocyanohydrines themselves.

The preparation of these novel thiocyanohydrines for the first time opens up new paths to the preparation of useful steroid compounds, which heretofore were obtainable in no known manner.

The following examples serve to illustrate various embodiments of the novel process of this invention, but the invention is not to be regarded as limited thereto.

EXAMPLE 1

6β-thiocyano-cholestane-3β,5α-diol

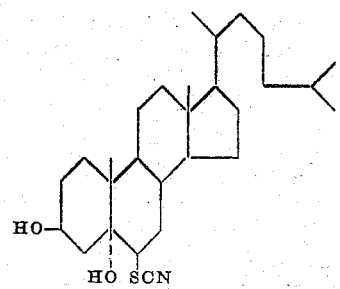

1.00 g. of 5α,6-oxidocholestane-3β-ol are dissolved in 40 ml. of methylene chloride and treated with 13.5 ml. of an ether solution of thiocyanic acid (molar ratio of epoxide to acid is 1:5). The mixture is allowed to stand in the dark at room temperature for 48 hours. The organic liquid phase is washed until neutral and free of thiocyanate with sodium bicarbonate solution and finally with water, and dried over $Na_2SO_4$. After concentrating and rubbing the residue with acetone, there were crystallized 0.65 g. of 6β-thiocyanocholestane-3β,5α-diol, which after two recrystallizations from ethyl acetate melted at 183–184°. (A product recrystallized from acetone contains acetone of crystallization and melts at 176–177°.)

Analysis: $C_{28}H_{47}O_2NS$.—Calculated: C, 72.8%; H, 10.26%; N, 3.07%; S, 6.9%. Found: C, 73.1%; H, 10.3%; N, 3.05%; S, 6.5%.

$/α/_D^{23}$ —51.8 (methylene chloride: c=0.01)

IR: $\lambda_{max}^{Nujol}$=2.90/2.96/3.52/4.63/6.80/6.86/7.28/7.28/8.08/ 8.65/8.95/9.30/9.70/9.95/10.35/10.88/13.48μ

EXAMPLE 2

6β-thiocyano-cholestane-3β,5α-diol 7.50 g. of 5α,6-oxidocholestane-3β-ol are dissolved in either 150 ml. acetone, or in 200 ml. ethanol, or in 75 ml. of pyridine and treated with 10.6 g. of pyridinium thiocyanate; (molar ratio epoxide to salt=1:5). In the case of the ethanol or the acetone solution is used, it is heated to boiling for 3 hours under reflux, while in the case of pyridine the solution is heated for 3 hours at 80°. Finally the solvent is distilled off under reduced pressure; the residue is treated with water and extracted with methylene chloride or chloroform. The organic phase is washed with water until free from thiocyanate or pyridine and dried over sodium sulfate. Yield is 5.35 g. after a single recrystallization from acetone; M. Pt. 173–174°.

EXAMPLE 3

6β-thiocyano-cholestane-3β,5α-diol 2.00 g. of 5α,6-oxidocholestane-3β-ol are dissolved in 100 ml. of methylene chloride or chloroform and shaken for 18 hours in the dark under nitrogen with 90 ml. of an approximately 25% aqueous thiocyanic acid solution at room temperature. Finally excess thiocyanic acid is neutralized to a weakly acid reaction with solid sodium bicarbonate; then the mixture is freed from precipitated polythiocyano compounds by suction filtration. After separation of the organic phase, the residue is twice extracted with methylene chloride, and the combined extracts are washed with sodium bicarbonate solution and water until thiocyanate-free and neutral, and dried over sodium sulfate. The yield after rubbing with acetone is 1.76 g., M. Pt. 174–176°. After recrystallization from ethyl acetate the melting point rises to 183–184°.

EXAMPLE 4

9α-thiocyano-11β-hydroxy-17α-methyltestosterone

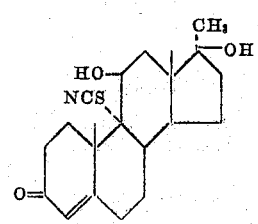

1.50 g. of 9β-11-oxide-17α-methyltestosterone are dissolved in 75 ml. methylene chloride or chloroform, and shaken in the dark under nitrogen for 18 hours at room temperature with 60 ml. of an approximately 25% aqueous thiocyanic acid solution. Finally, the excess thiocyanic acid is neutralized with solid sodium bicarbonate; the precipitated polythiocyano compounds are removed by filtration if necessary. The organic and aqueous phases are separated; finally the latter is extracted with methylene chloride. The organic extracts are washed with sodium bicarbonate solution in the usual way until thiocyanate-free, and dried over sodium sulfate. The crude product is recrystallized from ethyl acetate; yield 1.35 g., M. Pt. 133–140°.

Upon recrystallization from ethyl acetate and from acetone-hexane there were obtained 0.68 g. of 9α-thiocyano-11β-hydroxy-17α-methyltestosterone having a M. Pt. 148–149° (decomp.).

Analysis: $C_{21}H_{29}O_3NS$.—Calculated: C, 67.17%; H, 7.79%; N, 3.73%; S, 8.53%. Found: C, 67.6%; H, 7.9%; N, 3.9%; S, 8.4%.

$/α/_D^{23}$+196 (Acetone: c=0.01)

IR: $\lambda_{max}^{KBr}$=2.92/3.05(Schulter)/3.43/4.68/5.99/6.18/8.08/ 9.37/10.56/11.58/13.15/—13.20μ

UV: $\epsilon_{242}^{MeOH}$=14910

EXAMPLE 5

9α-thiocyano-hydrocortisone-21-acetate

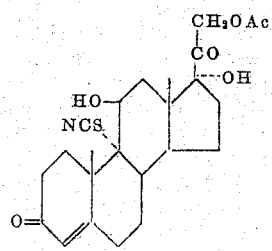

5.50 g. of 9β,11-oxido-Δ⁴-pregnene-17α,21-diol-3,20-dione-21-acetate are dissolved in 275 ml. of methylene chloride or chloroform are shaken with 220 ml. of an approximately 25% aqueous thiocyanic acid solution at room temperature for 18 hours in the dark under nitrogen. Processing takes place as in Example 4. The crude product yields, when rubbed with methanol, 3.66 g. of crystalline 9α-thiocyano-hydrocortisone-21-acetate, or 9α-thiocyano - Δ⁴ - pregnene-11β,17α,21-triol-3,20-dione-21-acetate; after double recrystallization from acetone-hexane the compound melts at 153–155° with decomposition. A sample freshly recrystallized from glacial acetic acid shows, with the same physical and analytical data, a melting point of 165–167° (decomposition).

Analysis: $C_{24}H_{31}O_6NS$.—Calculated: C, 62.40%; H, 6.78%; O, 20.83%; N, 3.05%; S, 6.94%. Found C, 62.0%; H, 6.9%; O, 21.0%; N, 3.2%; S, 6.7%.

$/α/_D^{23}$+162.2 (Methanol: c=0.01)

IR: $\lambda_{max}^{KBr}$=2.82/2.88/3.40/4.67/5.72/5.80/5.97/6.18/7.27/ 8.08/9.55/11.57/12.82/13.23μ

UV: $\epsilon_{242}^{MeOH}$=15150

The intense and sharp IR bands at 4.63 to 4.68μ were relied upon for identification of the steroid rhodanhydrines. The described steroid rhodanhydrines tend toward the addition of solvent of crystallization; acetone of crystallization and ethyl acetate of crystallization were observed.

EXAMPLE 6

*5-thiocyano-allo-pregnane-3β,6β-diol-20-one*

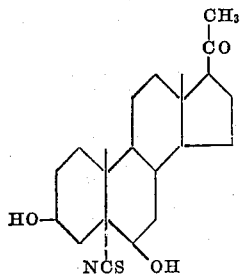

1 g. of 5α,6-oxidopregnane-3β-ol-20-one are dissolved in 50 ml. of methylene chloride or chloroform and shaken in the dark under nitrogen at room temperature for 17 hours with 40 ml. of an aqueous 25% solution of thiocyanic acid. The processing corresponds to that in Example 4; yield is 1.3 g. The crude product crystallizes after rubbing with hexane and a little acetone. After double recrystallization from ethyl acetate/hexane there are obtained 0.35 g. of pure crystalline product having a melting point of 161–162° (decomp.).

Analysis: $C_{22}H_{33}O_3NS$.—Calculated: C, 67.46%; H, 8.49%; N, 3.57%; S, 8.19%. Found: C, 67.4%; H, 8.6%; N, 3.6%; S, 8.2%.

$/\alpha/_D^{28} + 14°$ (Methylenechloride: c=0.01)

IR $\lambda_{max}^{KBr} = 2.96 - 2.99\mu$ (OH)/$4.67\mu$ (—SCN)/$5.88\mu$ (20-CO)

EXAMPLE 7

*16β-thiocyano-Δ⁵-pregnene-3β,17α-diol-20-one-3,17-diacetate*

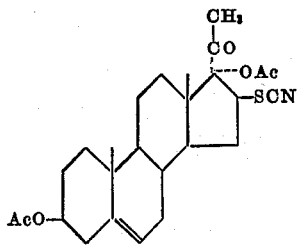

10 g. of 16α,17-oxido-Δ⁵-pregnene-3β-ol-20-one-3-acetate are dissolved in 215 ml. of glacial acetic acid and treated with a glacial acetic acid-thiocyanic acid solution (a mixture of 10.7 g. of 100% sulfuric acid, 130 mol. glacial acetic acid, and 10 g. of dry sodium thiocyanate) at room temperature with vigorous stirring during about 20 minutes; the operation is carried out under a current of nitrogen.

Finally the mixture is heated 1½ hours with stirring at 100–105° bath temperature. The mixture is cooled in an ice bath and stirred into an excess of ice water (about 2.5 liters). The precipitated compound is filtered off by suction, washed thoroughly with ice water, dissolved in methylene chloride, filtered and dried over sodium sulfate. Upon concentration in vacuo there results 11.8 g. of crude compound.

The crude product (3-monoacetate), is first purified by double recrystallization from methanol, or by simple partition between dimethylsulfoxide/ether-hexane; the 17α—OH group of the prepurified product is acetylated with acetic anhydride in presence of p-toluenesulfonic acid. After the usual processing and double recrystallization from methanol there are obtained 3.3 g. of the 3,17-diacetate, M. Pt. 235.5–237°.

Analysis: $C_{26}H_{35}O_5NS$.—Calculated: C, 65.9%; H, 7.45%; N, 2.96%; S, 6.77%. Found: C, 66.0%; H, 7.9%; N, 3.2%; S, 6.7%.

$/\alpha/_D^{28} + 18°$ (Methylenechloride; c=0.01)

IR $\lambda_{max}^{KBr} = 4.67\mu$ (—SCN)/$5.78\mu$ (3 and 17-acetate; C=O)/$5.86\mu$ (Schulter) 20-CO/$8.03\mu$, $8.18\mu$ (Schulter) Acetate/$9.67\mu$ (Acetate)/Weaker OH-Bands at $2.95\mu$

We claim:
1. 9α - thiocyano - 11β - hydroxy-17α-methyltestosterone.
2. 9α-thiocyanohydrocortisone-21-acetate.

No references cited.